United States Patent [19]

Adachi et al.

[11] Patent Number: 5,768,489
[45] Date of Patent: Jun. 16, 1998

[54] PRINT PROCESSING SYSTEM AND METHOD

[75] Inventors: Koji Adachi; Hiroshi Ishikawa; Koushi Kawamoto, all of Ashigarakami-gun, Japan

[73] Assignee: Fuji Xerox Co., Ltd., Tokyo, Japan

[21] Appl. No.: 729,373

[22] Filed: Oct. 17, 1996

[30] Foreign Application Priority Data

Oct. 20, 1995 [JP] Japan .................. 7-272240

[51] Int. Cl.$^6$ .................. G06K 15/00
[52] U.S. Cl. .................. 395/117; 395/112
[58] Field of Search .................. 395/101, 112, 395/113, 114, 115, 116, 117, 670, 671, 672, 673, 674, 677, 678, 860, 878; 345/433, 440, 502–507; 707/517, 520, 521; 358/448, 453, 467

[56] References Cited

U.S. PATENT DOCUMENTS

| | | | |
|---|---|---|---|
| 4,949,280 | 8/1990 | Littlefield | 395/114 |
| 5,216,754 | 6/1993 | Sathi et al. | 395/115 |
| 5,333,246 | 7/1994 | Nagasaka . | |

FOREIGN PATENT DOCUMENTS

| | | |
|---|---|---|
| A-1-188374 | 7/1989 | Japan . |
| A-4-128068 | 4/1992 | Japan . |
| A-6-86032 | 3/1994 | Japan . |
| A-6-168087 | 6/1994 | Japan . |

OTHER PUBLICATIONS

PostScript Reference Manual Second Edition by Adobe Systems, ASCII Co., Ltd., 1991.

*Primary Examiner*—Arthur G. Evans
*Attorney, Agent, or Firm*—Oliff & Berridge, PLC

[57] ABSTRACT

In a print processing system and method that carries out rasterize processing in order to obtain pixel information for printing purposes from a source file which includes print information written in a predetermined print control language, command sequences that form a meaningful unit in terms of syntax are integrated into drawing and environment contents corresponding to the type of command. Clusters are formed from the drawing contents and the environment contents required to process those drawing contents, and the clusters are assigned to processors, respectively. The assignment of the clusters to the processors is carried out in consideration of overlaps between image elements so as to assure the order of arrangement of the image elements.

19 Claims, 13 Drawing Sheets

```
       (ENVIRONMENT CONTENTS 1,
(ENVIRONMENT CONTENTS 2, (ENVIRONMENT CONTENTS 6, DRAWING
CONTENTS 1))
(ENVIRONMENT CONTENTS 3
(ENVIRONMENT CONTENTS 4 (ENVIRONMENT CONTENTS 7 DRAWING
CONTENTS 3))
       (DRAWING CONTENTS 2
(ENVIRONMENT CONTENTS 5 (ENVIRONMENT CONTENTS 7 DRAWING
CONTENTS 4))
)
```

PRINT PROCESSING SYSTEM AND METHOD

BACKGROUND OF THE INVENTION

1. Field of the Invention

The present invention relates to a print processing system and method which produce printed output by processing the print information described in print languages, such as page-description languages, using a plurality of image forming units.

2. Description of the Related Art

As development of a print system suitable for use in high-speed digital printing operations such as electrophotography or ink-jet printing operations, a print control method that breaks from conventional textual-information-oriented printing, that deals with images, graphics, characters, or the like, in the same manner, and that uses "page-description languages" capable of freely controlling the enlargement, reduction, rotation, and deformation of characters or graphics has achieved widespread use. Various page-description languages were developed during the 1980s. PostScript (a registered trademark of Adobe Systems in U.S.) and Interpress (a registered trademark of Xerox Corporation in U.S.) are representatives of the page-description languages. Various printers employ many page-description languages.

In a conventional page-description language processing print system, the central processing unit (CPU) of the print system sequentially interprets a page-description language, whereby a printer of the print system executes a printing operation. One example of the conventional page-description language processing print systems is disclosed in Unexamined Japanese Patent Publication No. Hei-1-188374. The conventional page-description language processing print system is provided with a storage device that receives and stores a program for printing purposes (hereinafter referred to as print information) fed from a computer (hereinafter referred to as a host computer), a processor for sequentially interpreting that information, and a printing apparatus for executing a printing operation according to the thus-interpreted print information. After the print information has been transmitted from the host computer to the printing apparatus, the printing apparatus translates the print information and carries out a printing operation, whereby the load on the host computer is relieved. In consequence, the possessing speed of the overall print system is improved.

The sharing of a printing apparatus is standard practice in a distributed network environment. Such a printing apparatus receives print requests from many host computers and must interpret and execute the print information described in a page-description language. Where many host computers concurrently use that printing apparatus, the printing apparatus serially interprets and executes the print information described in the page-description language, which results in a longer wait time elapsing between requesting and receiving print output.

To solve the foregoing problem and process print information at high speed, several techniques have been proposed: for example, a multiprocessing print processing system (see, e.g., Unexamined Japanese Patent Application No. Hei-4-128068) that interprets and executes print information in a parallel manner by use of a plurality of processors which are tightly coupled through a bus, or a print processing system (see, e.g., U.S. Pat. No. 5,333,246) that interprets and executes print information in a parallel manner by means of a distributed network consisting of a plurality of loosely-coupled processors.

In the print processing system disclosed in Unexamined Japanese Patent Application No. Hei-4-128068, a special processing is not carried out with regard to the division of print information in order to interpret and execute the print information in a parallel manner. The print information is simply divided page by page. In the case of the print information whose print job consists of a plurality of pages, a processing time is reduced. However, in the case of the print information whose print comprises only one page, the effect of reducing the processing time is not achieved.

In the print processing system disclosed in U.S. Pat. No. 5,333,246, the overlap between images is detected with regard to the division of the print information in order to interpret and execute the print information in a parallel manner. The print information is divided on an image group basis which does not affect another image even if that image group is separated from the print information. The thus-divided print information is subjected to parallel processing. As a result, the order of arrangement of image elements is maintained during rasterizing processing, and therefore the completeness of images is assured (If the image elements are subjected to the rasterizing processing while they are arranged in a different order, a different image will be produced. For example, the portions of the image which should be invisible become visible, whereas the portions of the image which should be visible conversely become invisible). In this case, even in the case of the print information whose print job consists of one page, the effect of reducing the processing time is achieved. Since the processing is executed on a divided-image group basis, the time required to carry out the processing will become a bottleneck if some of the plurality of divided image groups are very complicated, for example, if they comprise overlapping images. As a result, the processing time of the entire page is not frequently reduced.

SUMMARY OF THE INVENTION

It is an object of the present invention to provide a print processing system and method capable of, when carrying out print processing using tightly or loosely coupled processors, minutely dividing print information and efficiently dividing the resource information required to process the thus-divided print information to improve the processing efficiency of the processors; as well as assuring the completeness of images by processing the divided print information while the order of arrangement of image elements is maintained even if the image elements overlap each other.

In a print processing system according to the present invention that carries out rasterize processing in order to obtain pixel information for printing purposes from a source file which includes print information written in a predetermined print control language, the print processing system comprises: a plurality of arithmetic processing units that execute the rasterize processing; a token analyzing unit for analyzing tokens of the source file and producing a print information command stream; a syntax analyzing unit for analyzing syntax of the print information command stream and sequentially producing a command sequence to constitute a meaningful unit in terms of a syntax rule of the print language; a document syntax analyzing unit for analyzing a stream of the command sequence and sequentially integrating one or a series of command sequences into environment contents including a command sequence for specifying a drawing environment or drawing contents including a command sequence for specifying a drawing operation; a resource attribute analyzing unit for analyzing streams of the environment contents and the drawing contents, and for determining the rasterize processing resource required to execute the drawing contents; a dependency analyzing unit for determining an order of processing of the plurality of drawing contents whose drawing results overlap each other on a print page; a print information dividing unit for allocating the environment contents and the drawing contents to the plurality of arithmetic processing units on the basis of the rasterize processing resources determined by the resource attribute analyzing unit and the processing order determined by the dependency analyzing unit; and a printing unit for carrying out a printing operation according to the results of the processing of the plurality of arithmetic processing units.

With this arrangement, the source file that is prepared by a host computer, or the like, and includes descriptions regarding print information is pre-processed in the host computer or the print system before it is subjected to rasterizing processing. In other words, the tokens and syntax of the source file are analyzed, whereby a command sequence is generated. The thus-generated command sequence is further integrated into the environment and drawing contents. The environment and drawing contents are further subjected to determination with regard to the attribute and spatial overlapping (dependency) of the resource. The environment and drawing contents are assigned to the plurality of arithmetic processing units on the basis of the result of the determination. Each arithmetic processing unit carries out rasterizing processing. In this way, the print information is handled in drawing and environment contents in this arrangement. The processing of the drawing and environment contents can be scheduled on the basis of the attribute and spatial dependency of the resource. As a result, the resource information can be effectively utilized. Even in the case of overlapping image elements, efficient multiprocess print processing can be implemented while the completeness of images is assured.

PREFERRED EMBODIMENTS OF THE INVENTION

With reference to the accompanying drawings, a print control processing system according to embodiments of the present invention will be described hereinbelow.

[First Embodiment]

This first embodiment relates to the application of the present invention to a multiprocessor system that has a plurality of arithmetic processing units (processors) tightly coupled by means of shared memory.

Figure 1:
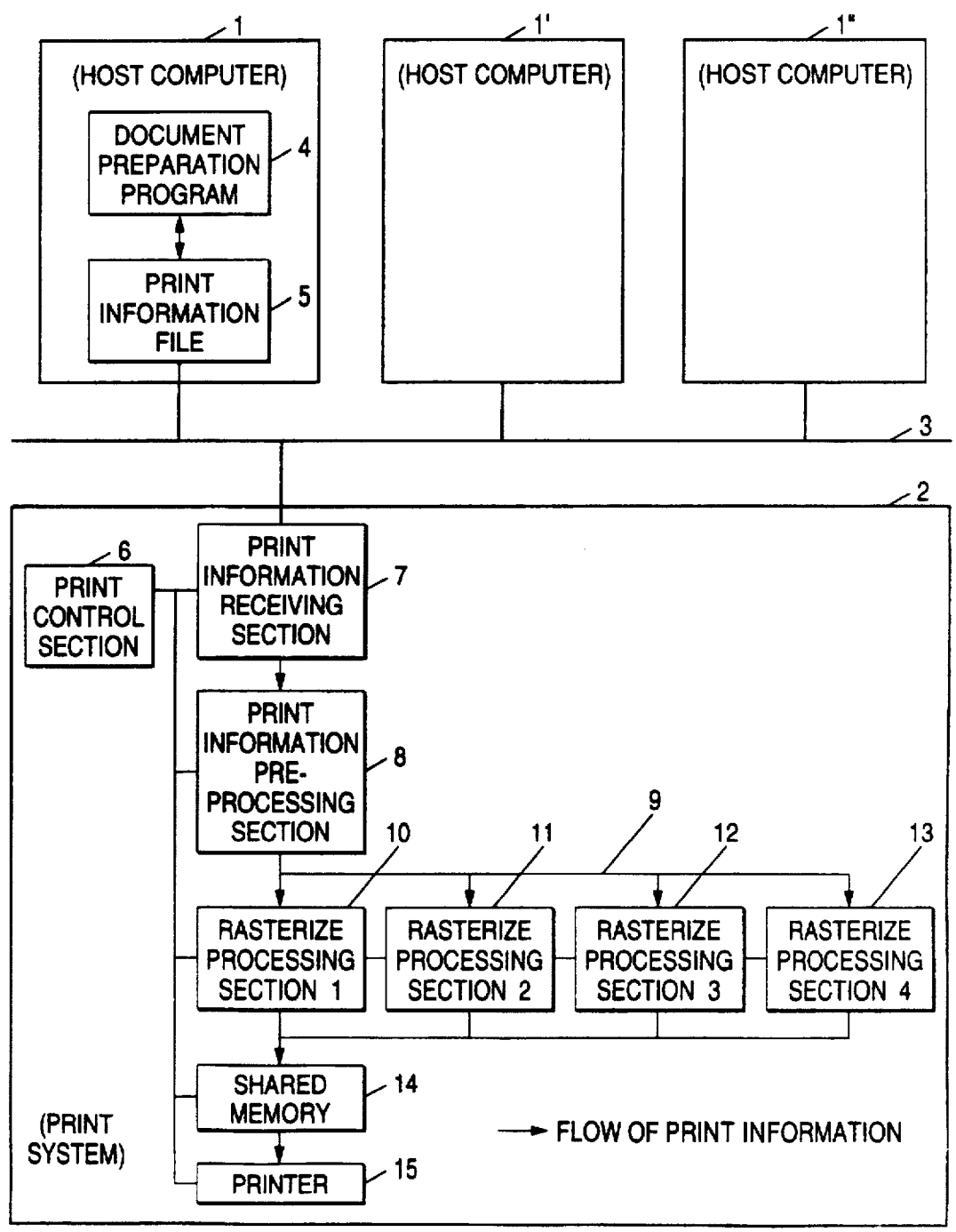
FIG. 1 is a diagrammatic representation of an example of the configuration of a print processing system of a first embodiment of the present invention.

FIG. 1 is a diagrammatic representation of the exemplary configuration of a print processing system according to the first embodiment of the present invention. In the drawing, the print processing system of the present embodiment has host computers 1, 1', 1" .... and a print system 2 connected to the host computers through a communications network 3.

Each of the host computers 1, 1', 1", .... is made up of a personal computer, a workstation, or the like. In the present invention, the host computers 1, 1', 1", .... are provided with a document preparation program 4. A print information file 5 transmitted to and output from the print system 2 is prepared by the document preparation program 4. Although the print information file 5 of the present embodiment is written in, e.g., PostScript, it may be written in another page-description language such as Interpress or a graphics command such as GDI (Graphics Device Interface which is a registered trademark of Microsoft Co., Ltd. in U.S.) or QuickDraw (Apple Corporation in U.S.).

The print system 2 produces printed output by subjecting the print information file 5 transmitted from the host computers 1, 1', 1", .... to rasterizing processing. The print system 2 has; for example, a print control section 6, a print information receiving section 7, a print information preprocessing section 8, rasterizing processing sections 10, 11, 12, and 13, shared memory 14, and a printer 15. Here, the print control section 6, the print information receiving section 7, the print information pre-processing section 8, and the rasterize processing sections 10, 11, 12, and 13 are executed in the print system 2 in the form of software.

The print control section 6 controls the flow of print information from the print information receiving section 7 to the printer 15. The print information receiving section 7 receives the print information file 5 from the host computers 1, 1', 1" ... and temporarily maintains the thus-received print information file 5 in, e.g., a magnetic disk.

The print information pre-processing section 8 constitutes the principal elements of the present invention. In short, this section divides the print information file 5 and schedules the thus-divided print information files. Then, the print information pre-processing section distributes the scheduled print information files to the plurality of arithmetic processing units.

The rasterize processing sections 10, 11, 12, and 13 are a rasterize process carried out in four arithmetic processing units coupled by an internal bus. In this embodiment, although there are at least four arithmetic processing units, further arithmetic processing units may be provided in order to execute software other than the rasterize processing. The rasterize processing is carried out in accordance with the performance of the printer 15 (a resolution, color reproducing characteristics, a gradation, a recording size, etc.).

The shared memory 14 has a semiconductor memory such as RAM coupled with the above-described four arithmetic processing units by the internal bus. The shared memory 14 has a work area for use with the rasterize processing of each arithmetic processing unit and raster image memory for use in producing printed output corresponding to at least one page of the printer 15.

The printer 15 is a laser-scan color page printer that employs electrophotography and is capable of outputting a full-color image through repetition of exposure, development, and transfer operations for each of CMYK (cyan, magenta, yellow, and black). Specifications related to the performance of this color page printer are as follows: for example, a A3-recording size, 400-dpi (dot per inch) resolution, and an 8-bit gradation for every color. In the present embodiment, the raster image memory has at least 128 MB (megabytes).

Although the print information pre-processing section 8 that constitutes the principal elements of the present invention is contained in the print system 2 in the present embodiment, it is not limited to such a configuration. A unit for carrying out similar processing may be incorporated in the host computers 1, 1', 1", . . . . .

Figure 2:
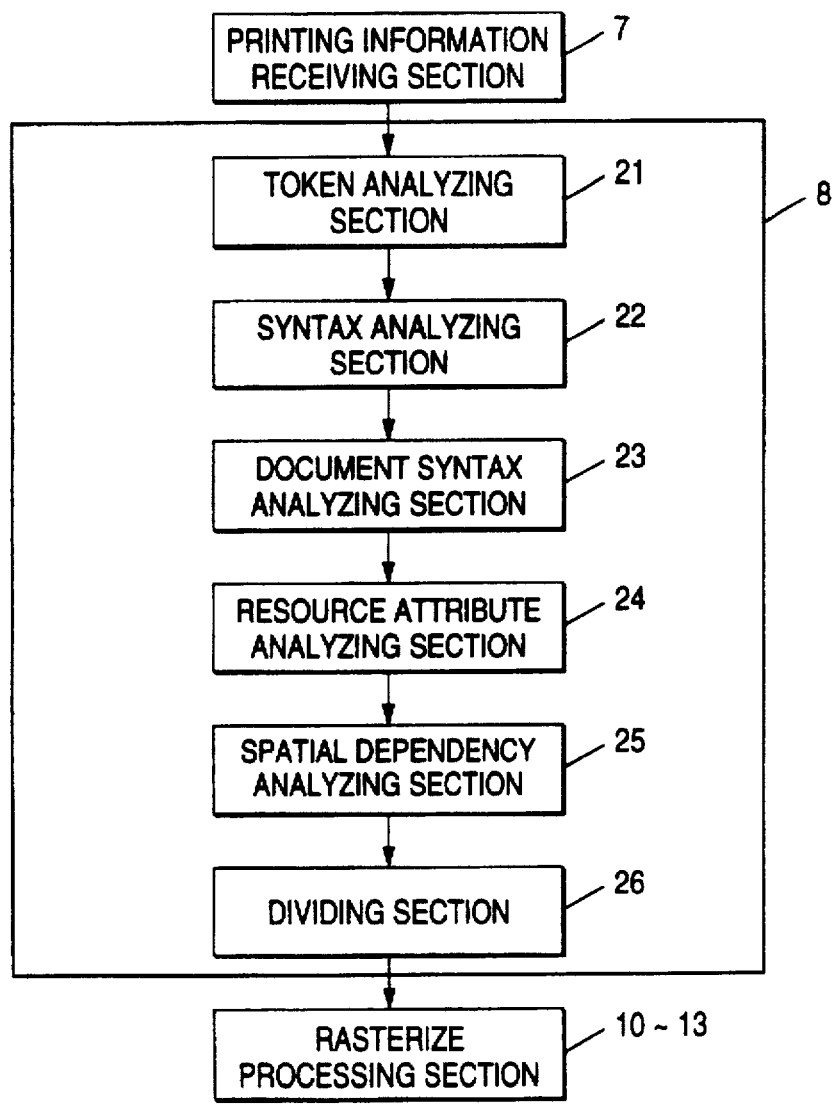
FIG. 2 is a block diagram of a print information preprocessing section of the first embodiment.

FIG. 2 shows a block diagram of the print information pre-processing section 8. In this drawing, the print information pre-processing section 8 has a token analyzing section 21, a syntax analyzing section 22, a document structure analyzing section 23, a resource attribute analyzing section 24, a spatial overlapping analyzing section 25, and a dividing section 26.

The token analyzing section 21 recognizes the print information file 5 as an operation command of a predetermined page-description language (PostScript in this embodiment) and an operand required to execute that operation command. The token analyzing section 21 internally presents the operation command and the operand in a train of tokens. One example of techniques of analyzing these tokens is an analyzing technique that employs a finite-state machine and is disclosed in the book entitled "Compilers-Principles, Techniques, and Tools" by Aho, A., Sethi, R., and Ullman, J. D., published by Addison-Wesley, 1986.

Figure 4:
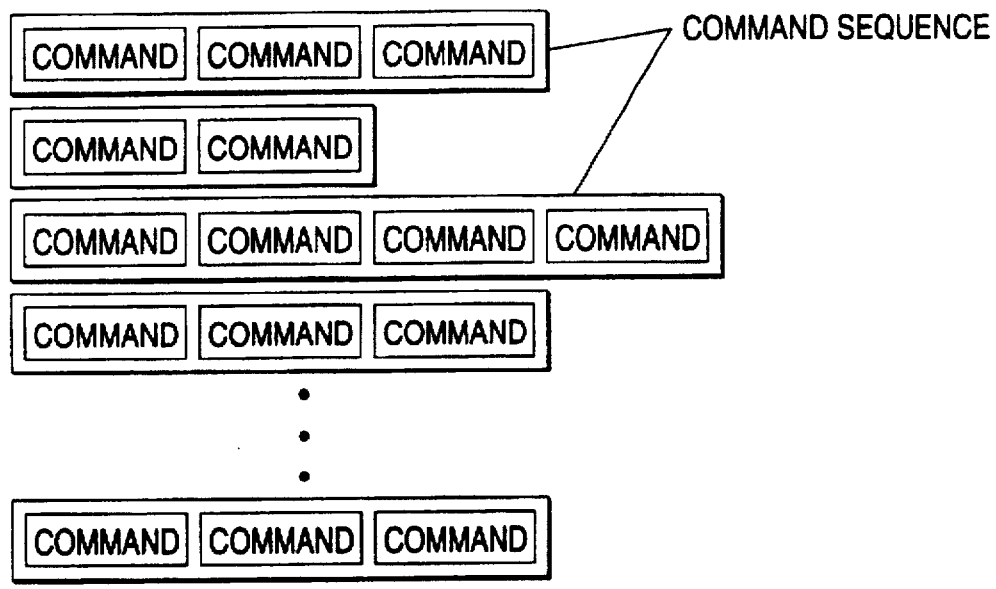
FIG. 4 is a diagrammatic representation of commands and command sequences.

The syntax analyzing section 22 structures the tokens generated by the token analyzing section 21 in the form of a syntax tree as the array of tokens pursuant to a syntax rule. An interpreter page-description language like PostScript is sequentially interpreted and executed by a stack machine, and therefore it does not hold an individual syntax-tree representation. In the present invention, a printing operation is not sequentially carried out, but division of a command and optimization are carried out in consideration of the overall print processing information. For this reason, the syntax tree must be represented as the basics of the print processing information. The print information that is analyzed by the syntax analyzing section in the form of a syntax-tree will be particularly referred to as a command sequence hereinafter. FIG. 4 diagrammatically illustrates commands and command sequences. The command sequences of the print information includes status information for use in subjecting the print information to rasterize processing, an environment command sequence which represents resource information, and a drawing command sequence which is directly subjected to the rasterize processing. The specific descriptions of the command sequences related to PostScript in the present embodiment are disclosed in detail in the book entitled "PostScript Reference Manual Second Edition" by Adobe Systems, ASCII Co., Ltd., 1991.

The command sequences of the print information includes document structure information such as the number of pages and/or a recording size, information relevant to a printer such as a resolution and/or a double-sided printed output, resource information for use in rasterize processing of fonts and/or OPI (Open Pre-press Interface) servers, and draw information directly related to the rasterize processing. In the present embodiment, command sequences that are related to the document structure information, the information relevant to a printer, and the resource information are defined as environment command sequences, whereas command sequences related to the draw information are defined as draw command sequences.

A series of environment command sequence groups required to carry out rasterize processing are defined as environment contents. Further, a series of draw command sequence groups, which carry out rasterize processing of the same type under the same environment content conditions, are defined as the draw contents.

Figures 7, 8:
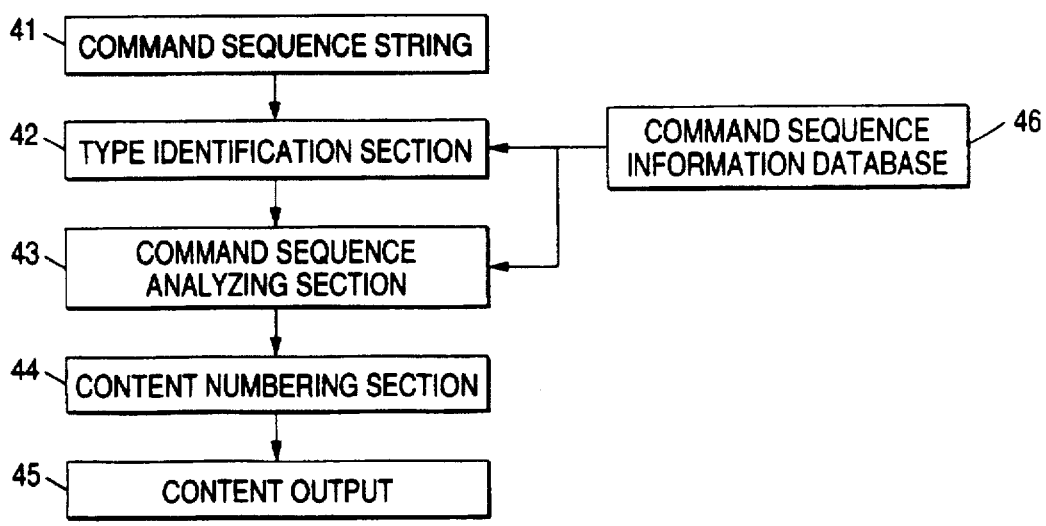
FIG. 7 shows results of the document syntax analysis and the resource attribute analysis.
FIG. 8 is a block diagram of the document syntax analyzing section.

The document syntax analyzing section 23 extracts the environment and draw contents from the command sequences of the print information. FIG. 8 is a block diagram of the document syntax analyzing section 23. In the drawing, a string of command sequences 41 input from the syntax analyzing section 22 are initially determined by a type determination section 42 upon reference to information of a command sequence information database (D/B) 46 as to whether they are the environment command sequences or the draw command sequence. Similarly, a command sequence analyzing section 43 determines whether or not the input command sequence group is a series of consecutive sequence groups, upon reference to the information of the command sequence information database (D/B) 46. The input command sequence group is numbered by a content numbering section 44, so that a series of consecutive sequence groups are output as contents.

Figure 5:
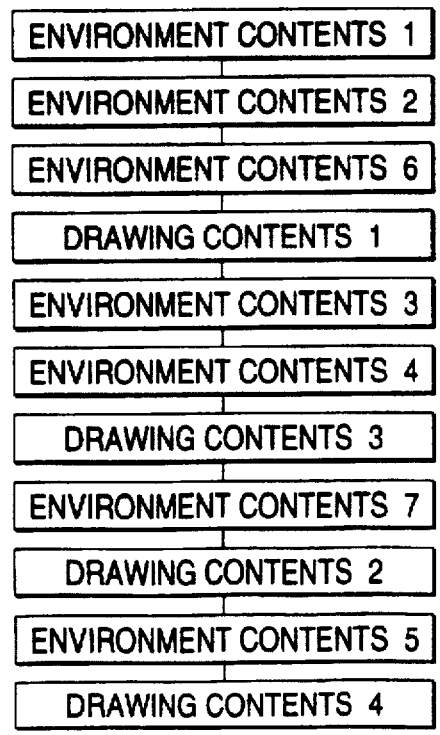
FIG. 5 is a diagrammatic representation of the structure of a document extracted by a document syntax analyzing section.

FIG. 5 is a diagrammatic representation of the document structure extracted by the document syntax analyzing section 23. In the drawing, environment contents 1 are, for example, document structure information of the entire document (e.g., the number of all the pages, a recording size, an output resolution, or the like). Environment contents 2 are, for example, environment information that shows a first page of the document. Environment contents 6 are, for example, environment information for use in plotting the drawing contents 1 (e.g., an input resolution or input color signals in the case where the drawing contents 1 are draws of image data such as photographic data). Environment contents 3 are, for example, environment information that shows a second page of the document.

Figure 6:
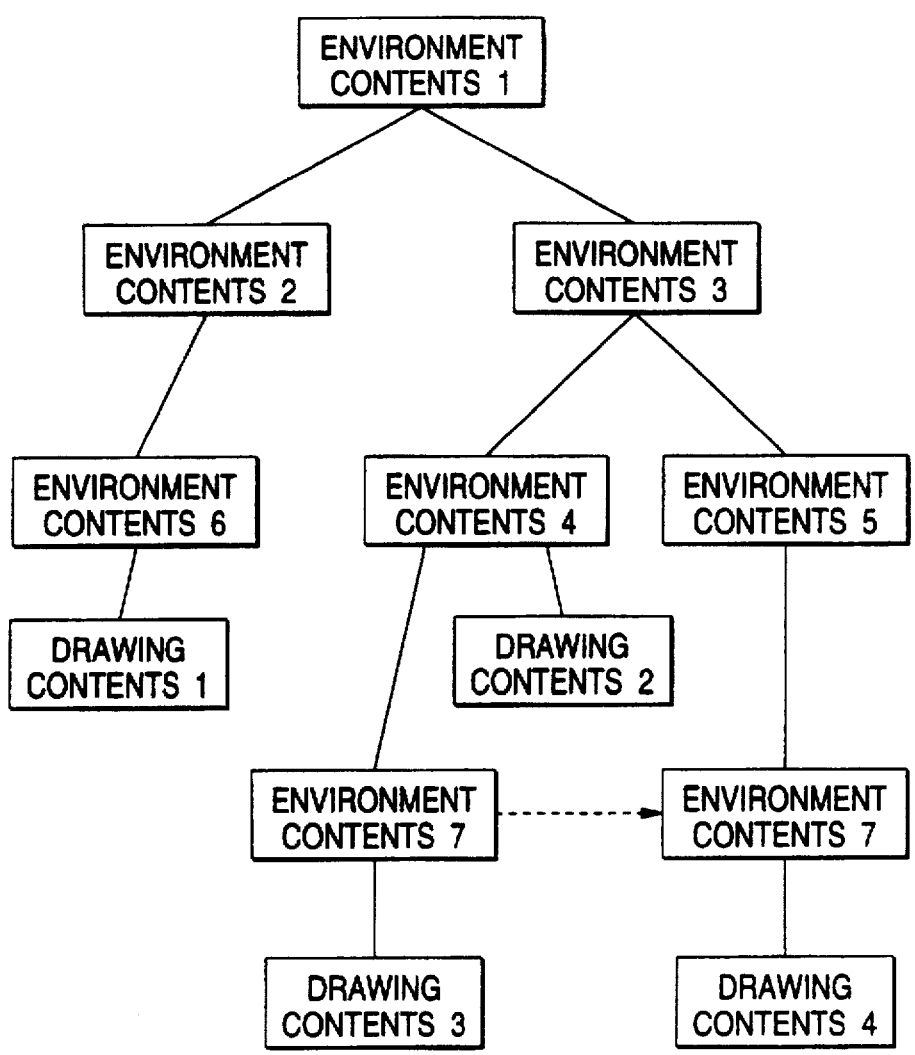
FIG. 6 is a tree structure of resource attribute analysis.

The resource attribute analyzing section 24 analyzes environment parameters of each page extracted by the document syntax analyzing section 23 and the attribute of the draw command sequences. FIG. 6 is a tree-structure of the analysis of resource attributes. In FIG. 6, the attribute of the environment contents required to carry out the rasterize processing are represented for each drawing content. In this tree structure, environment contents 7 below environment contents 5 are not shown in a right portion of FIG. 6.

However, the environment contents 7 are continued from the environment contents 7 below environment contents 4. The results of the analysis of the document structure analyzing section 23 and the resource attribute analyzing section 24 are temporarily stored in the form of a list as shown in FIG. 7.

The environment contents required by the drawing contents or required to plot each specific drawing content are formed on the basis of a content formation rule. The stream of the command sequence input from the syntax analyzing section constitutes drawing contents and environment contents on a page-by-page basis according to the knowledge of structure information database. The structure information database has a register for holding the environment contents required to plot specific drawing contents. The leading edge of the command sequences received from the syntax analyzing section is a command for setting an environment using normal environment contents. The font information set by the command: for example, a font name, a font size, and a font style, is stored in the previously-described register. Drawing command sequences that are executed in the environment stored in the register follow the above-described leading edge. In the present embodiment, one environment content is formed when one environment command sequence is received from the syntax analyzing section. However, the formation of the environment content is not limited to the above-described way. For example, it is also possible to form one environment content using a plurality of environment command sequences.

The drawing command sequence comprises three types: namely, one which is used to draw characters, another which is used to draw graphics, and the last one that is used to plot a line drawing. The drawing contents are specified to be formed from the same drawing environment. The same drawing environment means no changes in the font name, font size, and the font style. The stream of the command sequence is scanned in order from the first. Therefore, one drawing content is formed from the drawing command sequence of the same type from among the drawing command sequences received from the syntax analyzing section before a new environment command sequence is received in terms of the scanning order.

The drawing contents include the environment information required to plot each of specific drawing contents. The drawing command sequence that should form the same drawing content is determined according to the above-described content formation rule, and the thus-determined drawing command sequence is stored in the register. The drawing environment that is common to the drawing command sequences are also contained in the drawing contents in order to constitute a content tree which will be described later.

On the basis of a content tree formation rule of the resource attribute analyzing section, a content tree shown in FIG. 6 is formed from the stream of the tagged drawing and environment contents received from the document. The environment information in order to implement the drawing content is represented by a mutually hierarchical content tree.

As a result of the content tree being formed from all of the environment contents, the environment contents in the bottom layer are related to associated higher-level environment contents. The resource attribute analyzing section positions the drawing content, which has the same environmental conditions as those of the aggregate of the environments of the environment content in the bottom layer and an associated higher-level environment content, so as to be subordinate to the above-described environment content in the bottom layer. The environments of the drawing contents are the environment information stored in the previously-described register.

A processing scheduling section 35 described below distributes the drawing and environment contents to the rasterize processing section based on the thus-formed content tree on a processing-by-processing basis. The processing unit comprises a specific drawing content and the environment content required to execute this drawing content, in other words, a specific drawing content and an environment content associated with this drawing content.

Figure 9:
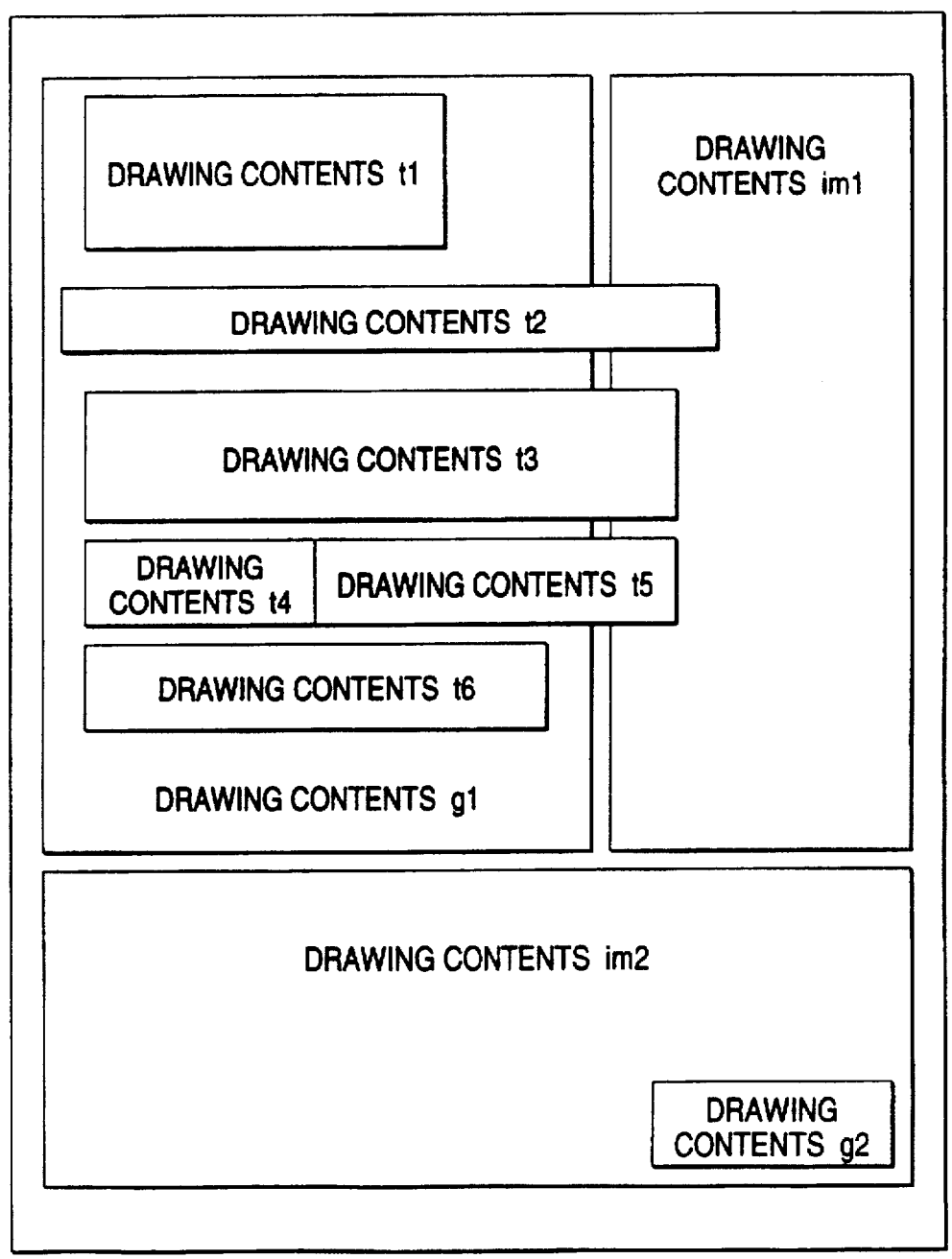
FIG. 9 is an example of a document that comprises independent image groups and overlaps between document contents in the image groups.

The spatial dependency analysis is the extraction of spatially independent image groups in the same page and the analysis of the overlapping relationship between drawing contents within the image group. FIG. 9 shows an example of a document that has overlaps between independent image groups and between the drawing contents within the image group. The drawing contents are illustrated in the drawing while they are divided into three groups which are different from each other with regard to the type of the rasterize processing of the drawing contents.

Figure 10:
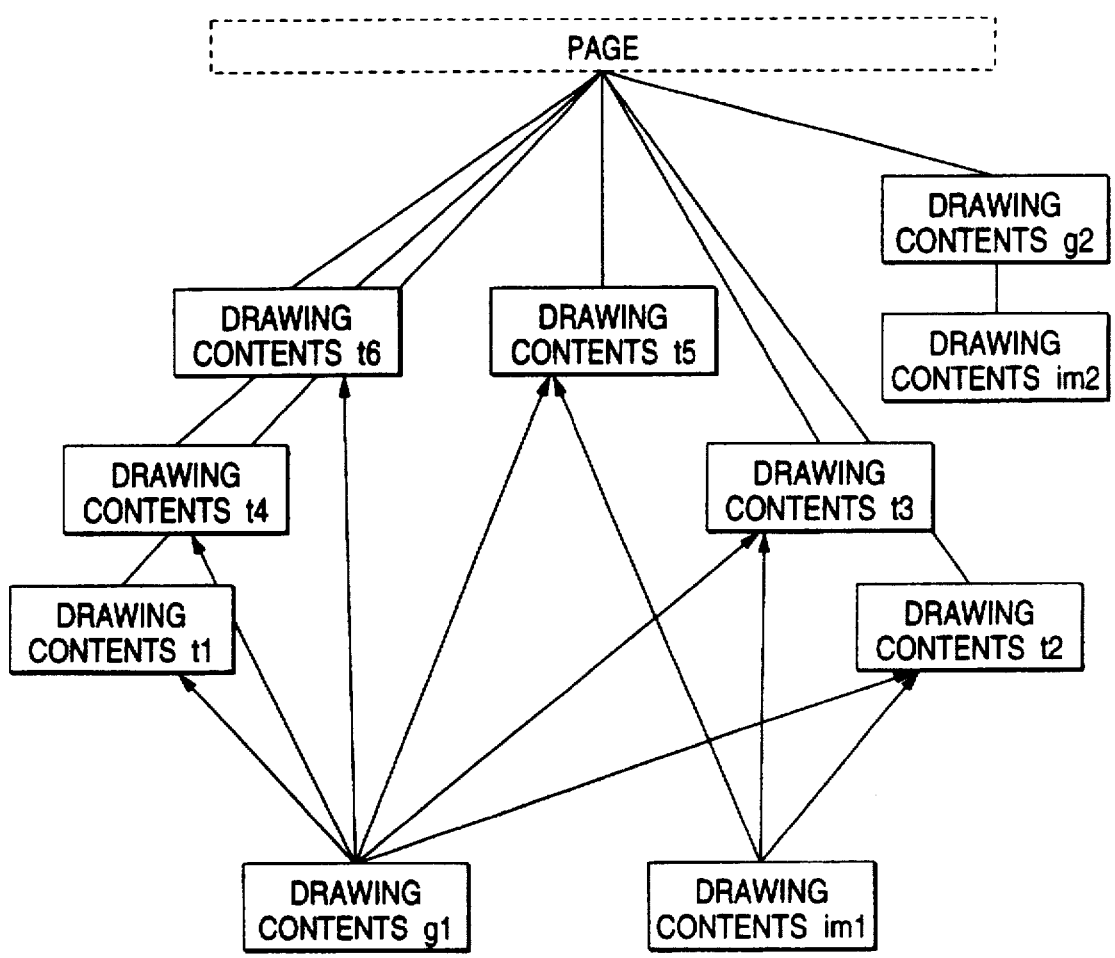
FIG. 10 is a diagram showing the overlapping relationship between the independent image groups and between the drawing contents.

Namely, the drawing contents are divided into drawing contents "t" that show text images, drawing contents "g" that show graphics images, and drawing contents "im" that show an image such as a photograph. The drawing content groups are respectively assigned serial numbers on a group-by-group basis in order to provide an easy understanding of the present invention. They may be assigned serial numbers that are independent of the type of contents. As shown in FIG. 9, the drawing contents are divided into an image group consisting of drawing contents im2 and drawing contents g2 and an image group consisting of all the remaining drawing contents. FIG. 10 shows the overlapping relationship between the independent image groups and between the drawing contents within the image group shown in FIG. 9. FIG. 10 shows the fact that an image formed by the drawing contents pointed by an arrow is overwritten on an image formed by the drawing contents from which the arrow originates. Although not disclosed for convenience of description, the type of each drawing content is identified by the content numbering section 44 of the document structure analyzing section 23.

The spatial dependency analyzing section 25 has to analyze the positional relationship and the overlapping relationship between the images formed by such drawing contents as shown in FIG. 9. Of the drawing contents, the drawing contents that represent an image such as a photograph are provided with descriptions about the position and size of the image which are included in the command sequences. Therefore, these drawing contents do not require special analysis. Further, even in the case of the drawing contents that represent text images, the command sequences include descriptions about the point of origin of the texts and a font size. Therefore, these drawing contents can be also analyzed with simple operations. U.S. Pat. No. 5,333,246 previously referred in the above also discloses three methods of analyzing the positional and overlapping relationship between the drawing contents that show graphics images. In the present embodiment, overlaps between drawings are determined by use of the first method disclosed in the above-described U.S. Patent. According to this method, a circumscribed rectangle of a certain drawing (or a plot) is obtained, and overlaps between drawings are determined on the basis of whether or not circumscribed rectangles of pictorial elements interfere with each other. This analyzing technique features simple execution in spite of a low accuracy of determination of the overlap, because it only requires a simple calculation of the minimum and maximum values with respect to the upper right and lower left points of the rectangle. In the present invention, the spatial dependency analysis is intended to obtain only the information for use in scheduling rasterize processing. For this reason, it is deemed to be desirable to carry out the analysis in a short period of time using a simpler method.

The result of the spatial overlapping analysis shown in FIG. 10 is temporarily stored in tabular form shown in, e.g., table 1. In table 1, an "up" column designates drawing contents to be written under other drawing contents, whereas a "down" column designates drawing contents to be overwritten on other drawing contents. Token "top" in the "up" column designates the highest-level image in the image group, and token "bottom" in the "down" column designates the lowest-level image. In addition to the "up" and "down" columns, table 1 provides a listing of the sizes of circumscribed rectangles (the number of pixels to be subjected to main scanning and the number of pixels to be subjected to sub-scanning). These sizes are used in the dividing section 26 in the subsequent stage.

TABLE 1

| Drawing Contents Number | Contents Type | Up | Down | Circumscribed Rectangle Size(*) |
|---|---|---|---|---|
| t1 | text | top | g1 | (760, 410) |
| t2 | text | top | g1, im1 | (1180, 160) |
| t3 | text | top | g1, im1 | ... |
| t4 | text | top | g1 | ... |
| t5 | text | top | g1, im1 | ... |
| t6 | text | top | g1 | ... |
| g1 | graphics | t1, t2, t3, t4, t5, t6 | bottom | ... |
| g2 | graphics | top | im2 | ... |
| im1 | image | t2, t3, t5 | bottom | ... |
| im2 | image | g2 | bottom | ... |

(*)the number of pixels to be subjected to main scanning and the number of pixels to be subjected to sub-scanning.

Figure 3:
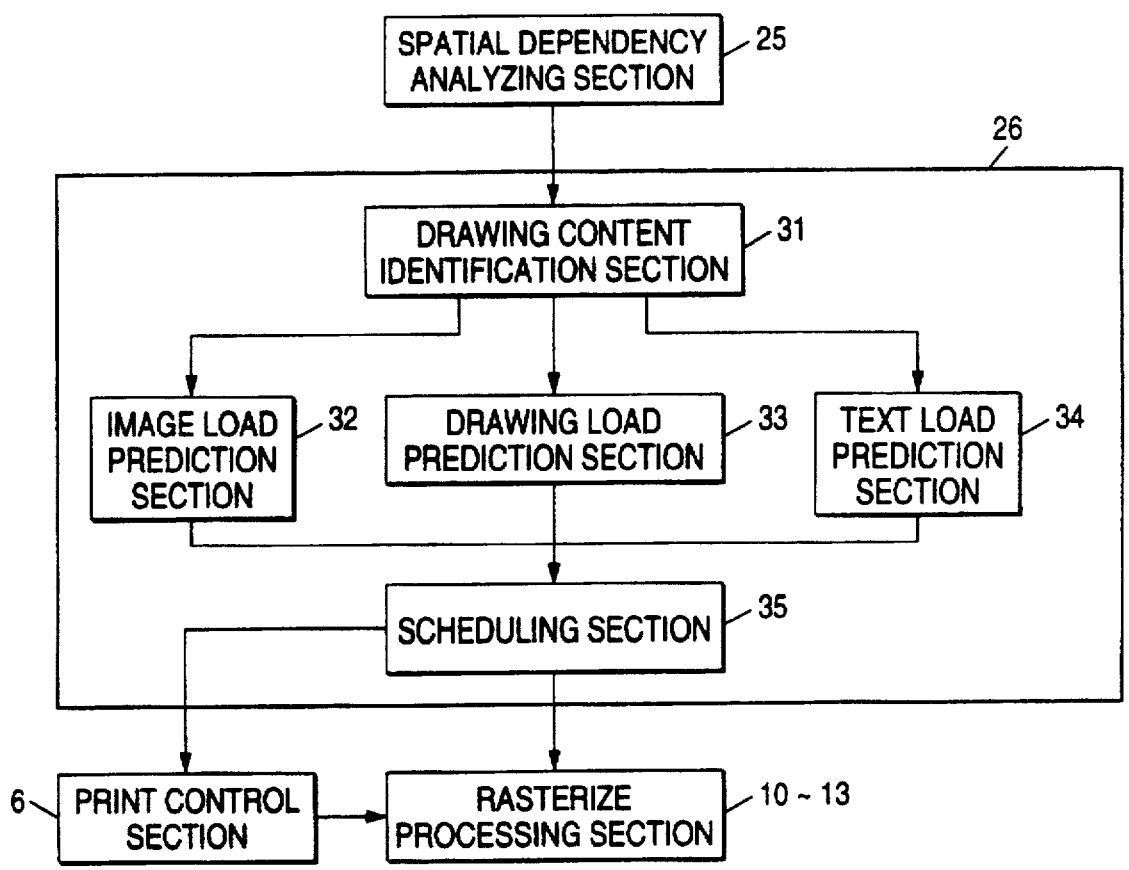
FIG. 3 is a block diagram of a dividing section of the first embodiment.

After the spatial dependency analysis, the string of drawing contents are input to the dividing section 26 so as to be subjected to rasterize processing by means of the plurality of arithmetic processing elements. FIG. 3 shows a block diagram of the dividing section 26. As shown in the drawing, the dividing section 26 has a drawing content identification section 31 for identifying the type of drawing content, load prediction sections 32, 33, and 34 disposed for respective drawing content types, and a scheduling section 35.

Figure 11:
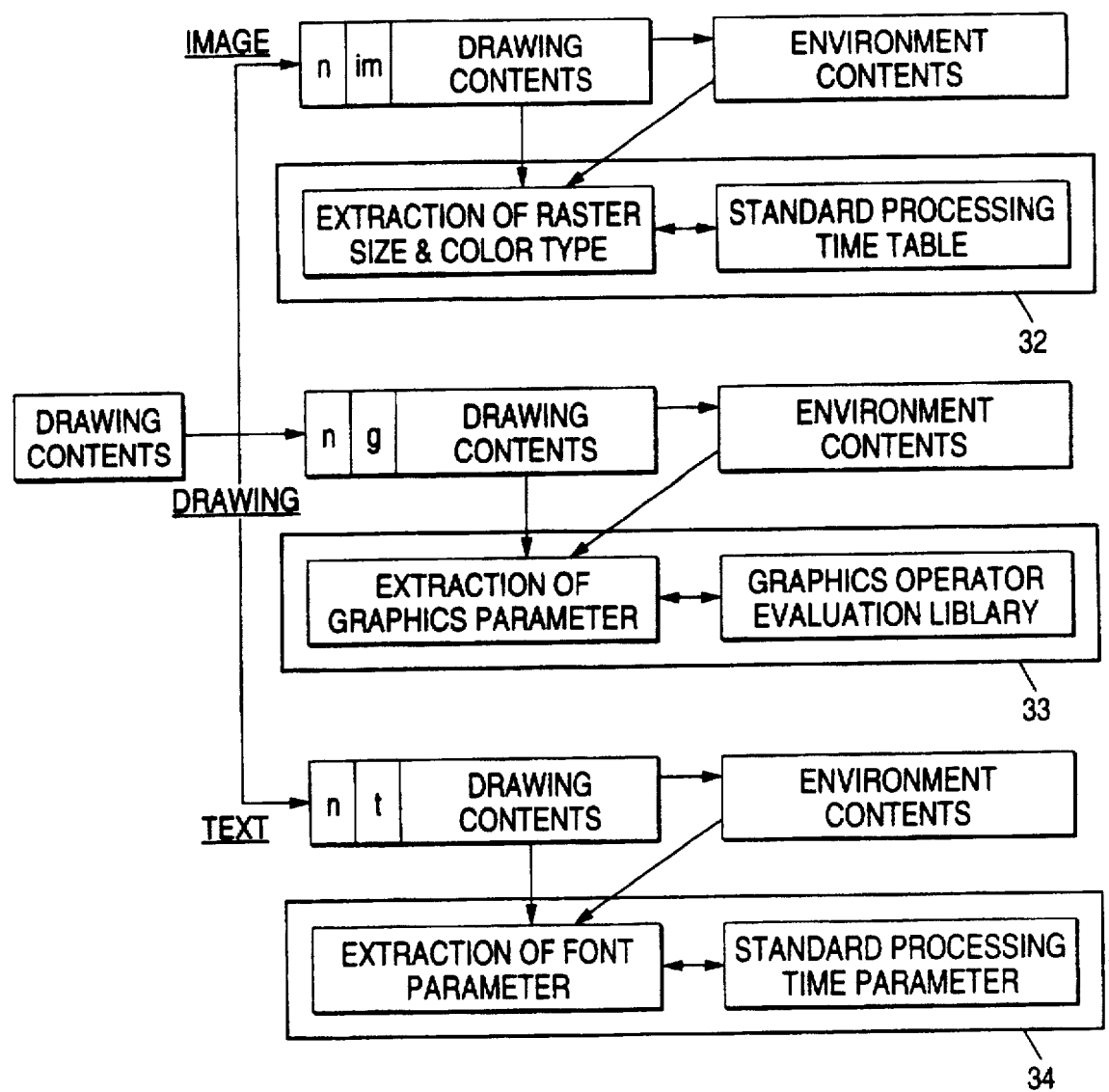
FIG. 11 is a block diagram of a load prediction section.

FIG. 11 is a block diagram of the load predictions 32, 33, and 34. In this illustration, the image load prediction section 32 extracts parameters such as the number of pixels to be subjected to rasterize processing, input color signals, or a result of the determination as to whether or not an image to be subjected to rasterize processing is OPI and refers to another file server, from the corresponding environment contents on the basis of the drawing contents and the resource attribute information. The image load prediction section 32 refers to a standard time table for use in predicting a load, whereby a processing time is predicted. Similarly, the text load prediction section 34 extracts parameters, such as the sizes and number of fonts to be subjected to rasterize processing and refers to the standard time table for use in predicting a load. As a result, a processing time is predicted. Further, the graphics load prediction section 33 extracts graphics parameters of each graphics operator and refers to a processing time evaluation library for each graphics operator, whereby a processing time is predicted.

The scheduling section 35 carries out scheduling of the processing of the drawing contents as well as distribution of the drawing contents on the basis of the above-described spatial dependency analysis and the predicted processing time of each drawing content so that the rasterize processing can be efficiently carried out by the plurality of arithmetic processing units in the subsequent stage. To this end, the distribution and scheduling of the drawing contents are carried according to the following guidelines (1) to (5) in the present embodiment.

(1) A predicted processing time is calculated for each image group within the page to be processed, the arithmetic processing unit is assigned to each image group on the basis of the ratio between the predicted processing times.

(2) The drawing contents are subjected to rasterize processing in ascending order from a lower layer of overlapping drawing contents within the image group.

(3) In the image group whose drawing contents are subjected to rasterize processing by the plurality of arithmetic processing units, the drawing content that is in a lower layer and takes a longer predicted processing time is first subjected to the rasterize processing.

(4) If the number of assigned arithmetic processing units is larger than the number of drawing contents in the same layer, the drawing contents in an upper layer without an overlap are subjected to rasterize processing.

(5) The processing of the next page will be carried out provided that the raster image memory corresponds to a plurality of pages, that the number of assigned arithmetic processing units is larger than the number of drawing contents in the same layer, and that there are no drawing contents to be processed.

The above-described distribution and scheduling method is based on the assumption that the arithmetic processing units have the same rasterize processing performance. Where some of the arithmetic processing units act as hardware accelators with respect to specific drawing contents, it is necessary to employ another distribution and scheduling method so that these arithmetic processing units can sufficiently exhibit their performance.

Taking the document shown in FIG. 9 as an example, an example of the distribution and scheduling of the drawing contents according to the previously-described guidelines (1) to (5) will be described. Table 2 shows, an example of predicted times required when each of the drawing contents shown in FIG. 9 is subjected to rasterize processing.

TABLE 2

| Drawing Content Number | Content Type | Rasterize Processing Time (sec.) |
|---|---|---|
| t1 | text | 4 |
| t2 | text | 4 |
| t3 | text | 3 |
| t4 | text | 3 |
| t5 | text | 7 |
| t6 | text | 4 |
| g1 | graphics | 7 |
| g2 | graphics | 7 |
| im1 | image | 13 |
| im2 | image | 10 |

Figure 12:
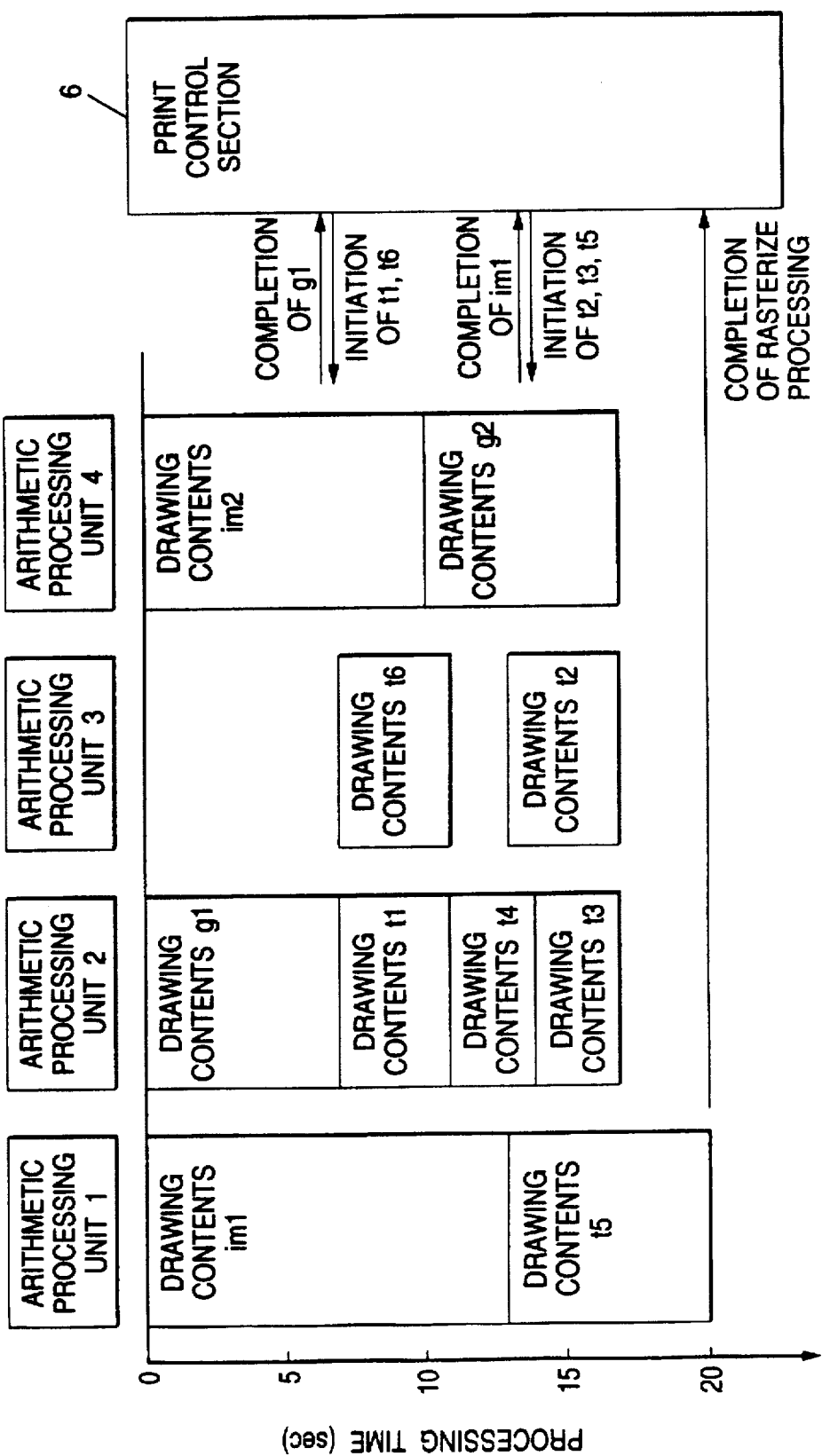
FIG. 12 is a diagrammatic representation of distribution and scheduling of the drawing contents.

FIG. 12 shows the distribution and scheduling of the drawing contents. The example will now be described with reference to FIG. 12. According to table 2, a total of predicted rasterize processing times of the image group 1 shown in FIG. 9 (i.e., the drawing contents other than the drawing contents im2 and g2) is 46 sec. On the other hand, a total of predicted rasterize processing times of the image group 2 (i.e., the drawing contents im2 and g2) is 17 sec. The ratio of the predicted processing time between the image group 1 and the image group 2 is about 2.65:1. Consequently, since four arithmetic processing units are provided in the present embodiment, and it is assumed that the arithmetic processing units have the same rasterize processing performance and the raster image memory corresponds to the print information of one page shown in FIG. 9; the image group 1 is assigned three arithmetic processing units, whereas the image group 2 is assigned one arithmetic processing unit according to the guideline (1) in the present embodiment. Subsequently, the drawing contents of the image group 2 are processed in the order of the drawing contents im2 and the drawing contents g2 according to the guideline (2). In the image group 1, a first arithmetic processing unit first processes the drawing contents im1 which are in the lowest layer and takes a long predicted processing time, and a second arithmetic processing unit processes drawing contents g1 according to the guideline (3). If it is possible for a third arithmetic processing unit to subject drawing contents without overlaps to rasterize processing according to the guideline (3), the rasterize processing will become efficient. However, there are no such drawing contents. Therefore, after the completion of the rasterize processing of the drawing contents g1 currently being processed by the second arithmetic processing unit, drawing contents t1, t4, and t6 that do not overlap the drawing contents im1 are subjected to rasterize processing in descending order of predicted processing time by means of the second and third arithmetic processing units according to the guideline (4). Similarly, after the completion of the rasterize processing of the drawing contents im1 currently being processed by the first arithmetic processing unit, the first arithmetic processing unit will subjects drawing contents t5 to rasterize processing. It turns out from the predicted processing times that the third arithmetic processing unit has already finished the rasterize processing of the drawing contents t6 when the rasterize processing of the drawing contents im1 is completed. Therefore, drawing contents t2 are processed by the third arithmetic processing unit after the completion of the rasterize processing of the drawing contents im1. Further, drawing contents t3 are processed after the second arithmetic processing unit has finished the rasterize processing of the drawing contents t4. The print control section 6 monitors and controls the completion of the rasterize processing of the drawing contents im1 and g1 and the initiation of the rasterize processing of drawing contents in an upper layer.

In the end, the rasterize processing is completed in 20 sec. according to the guidelines (1) to (5). The total time required to carry out the rasterize processing of the drawing contents is 62 sec. The activity ratio of all the arithmetic processing units is 62/(4×20)×100=71.5 (%). If a parallel processing method disclosed in U.S. Pat. No. 5,333,246 is applied to the present embodiment, the speed of the processing related to the image group 1 is increased. In this case, the rasterize processing time is 45 sec., and the activity ratio of all the arithmetic processing units is 62/(4×45)×100=34.4 (%).

The group of drawing contents that have been distributed to the arithmetic processing units and scheduled are transmitted to the plurality of rasterize processing sections 10, 11, 12, and 13 consisting of the plurality of arithmetic processing units together with the environment contents that correspond to the drawing contents and are necessary to subject the respective drawing contents to rasterize processing.

The print information pre-processing section 8 that constitutes the principal elements of the present invention has been described above. Subsequently, the plurality of arithmetic processing units temporarily hold the print information consisting of the drawing and environment contents and is received from the print pre-processing section, in a magnetic storage device, or the like. The thus-stored print information is then sequentially subjected to rasterize processing. The scheduling information is also transmitted to the print control section 6, and this print control section 6 monitors and controls the timing of the rasterize processing of the arithmetic processing units.

The operation of the previously-described print processing system according to the first embodiment of the present invention will be summarized as follows:

Users of the host computers 1, 1', 1" . . . prepare print information files written in page-description languages, or the like, using document preparation programs. The thus-prepared print information files are transmitted to the print system 2 over the communications network 3. The print information files are received and temporarily stored by the print information receiving section 7. The thus-stored print information files are divided into the drawing contents groups and the environment contents groups in the print information preprocessing section 8. Then, they are distributed to the rasterize processing sections 10, 11, 12, and 13, as well as being scheduled. The drawing contents and environment contents thus distributed and scheduled undergo rasterize processing in the raster-expansion memory of the shared memory 14 by means of the rasterize processing sections 10, 11, 12, and 13 while being monitored by the print control section 16. The image data on the raster-expansion memory are output to the printer 15.

As has been described above, by virtue of the first embodiment of the present invention, it becomes possible to efficiently divided the print information written in a page-description language, or the like, as well as to process the thus-divided print information in the print processing system that consists of a plurality of arithmetic processing units tightly coupled through a bus. As a result, the time required to carry out the rasterize processing of the print information is reduced, which enables improvements in the processing speed of the overall print processing system. Further, even in the case of overlapping image elements, the completeness of the images is assured.

[Second Embodiment]

A second embodiment is directed to the application of the present invention to a print processing system that employs arithmetic processing units loosely coupled through a communications network.

Figure 13:
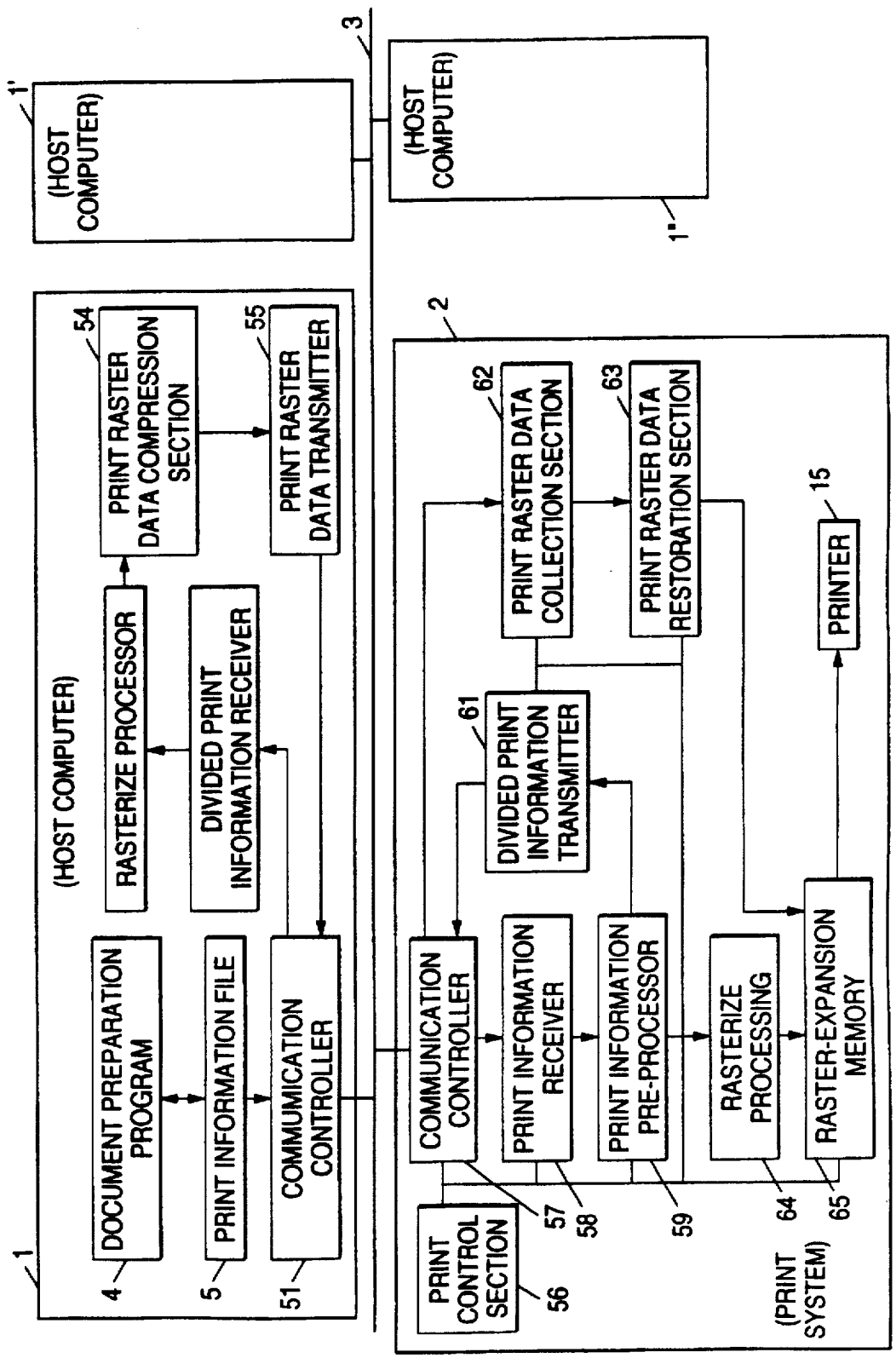
FIG. 13 is a diagrammatic representation of an example of the configuration of a print processing system of a second embodiment of the present invention.

FIG. 13 diagrammatically represents an example of the configuration of the print processing system of the second embodiment. The elements shown in FIG. 13 corresponding to the elements shown in FIG. 1 are assigned the same reference numerals, and therefore their detailed explanations will be omitted here for brevity. As similar to the first embodiment, the print processing system of the second embodiment shown in the drawing has the host computers 1, 1', 1", . . . and the print system 2. In the first embodiment, the rasterize processing of the print information is carried out by the plurality of arithmetic processing units of the print system 2. On the other hand, in the second embodiment, the rasterize processing of the print information is shared between the host computers 1, 1', 1", . . . as well as between the arithmetic processing units of the print system 2.

Accordingly, each of the host computers 1, 1', 1", .... has a communications controller 51, a divided print information receiver 52, a raster graphics processor 53, a print raster data compression section 54, and a print raster data transmitter 55 in addition to the document preparation program 4 and the print information file 5 of the first embodiment. The print system 2 has a print control section 56, a communications controller 57, a print information receiver 58, a print information pre-processor 59, a divided print information transmitter 61, a print raster data collection section 62, a print raster data restoration section 63, a rasterize processor 64, raster-expansion memory 65, and the printer 15. As in the first embodiment, the print information pre-processing section 8 that constitutes the principal elements of the present invention is also included in the print system 2. However, this element is not limitedly included in the print system 2. A unit that performs the processing similar to that of the print information pre-processing section may be included in the host computers 1, 1', 1", ....

The difference between the first embodiment and the second embodiment will be mainly described hereinbelow. First, the print information files 5 prepared by the host computers 1, 1', 1", .... are transmitted to the print system 2 through the communications controller 51. The thus-transmitted print information files are temporarily stored in the print information receiver 58 of the print system 2 through the communications controller 57. Here, the communications controller 51 and 57 are so-called network adapters. Although omitted from FIG. 1 for convenience of descriptions, they are shown in the drawings because a plurality of types of data are transmitted in the second embodiment.

The print information files 5 temporarily stored in the print information receiver 58 are distributed and scheduled by the print information pre-processor 59 so that they can be subjected to rasterize processing by means of the plurality of arithmetic processing units, as are done in the first embodiment. Some of the drawing contents distributed and scheduled by the print information pre-processor 59 are transmitted to the raster graphics processor 64 of the print system 2, whereas the remaining drawing contents are transmitted to the host computers 1, 1', 1", ...., which are connected to the print system 2 by the communications network 3, through the divided print information transmitter 61 and the communications controller 57 together with the environment contents for use in subjecting the drawing contents to rasterize processing.

The divided print information consisting of the drawing contents and the environment contents for use in rasterize processing is temporarily stored in the divided print information receiver 52 through the communications controller 51. The thus-stored divided print information is sequentially subjected to rasterize processing by the raster graphics processor 53. The thus-processed print raster data may be directly transmitted to the print system 2 by means of the print raster data transmitter 55. However, the print raster data has a massive amount of data, and the transmission of such print raster data over the communications network may result in a bottleneck in the processing of the system. To prevent this problem, the processed print raster data are transmitted to the print system 2 by the print raster data transmitter 55 after having been compressed by the print raster data compression section 54 in the second embodiment.

The data compression technique employed in the second embodiment is based on the technique disclosed in Unexamined Japanese Patent Publication No. Hei-6-86032. In other words, a run-length compression method is applied to the compression of text data and graphics data. Further, a compression/encoding method for use with a natural color image that is called PEG (Joint Photographic Coding Experts Group) and is subject of discussion in the International Organization for Standardization (ISO) is applied to image data such as photographic data. The former technique is implemented by software, and the latter technique is implemented by hardware because it takes a long time to carry out processing using software. Among three types of image elements, the text image data consist of binary mask data and constant color for use in coloring character data. The mask data can be compressed to $1/32$ of their original size with respect to 8 bits of raster image data that are color-coded in four colors. For the constant color, in many cases, data having a constant value continue over several hundreds to several thousands pixels in the main scanning direction. Therefore, it is possible to compress that data at a high compression rate using the method generally called run-length. As is the case of the constant color, in many cases, a similar image continues in the subscanning direction in the case of the constant color. It is possible to obtain a much higher compression rate by incorporating the information related to the continuation of mask data and constant color data in the respective main scanning and sub-scanning directions into compressed data. The graphics image data consist of only constant color, and therefore a similar high compression rate is achieved. Therefore, in the case of a document having few image data, a high compression rate of $1/10$ to $1/30$ is achieved. As previously described, the compression technique PEG is used when compressing image data. This compression/encoding technique is described in detail as a variable-length encoding method called DCT (Discrete Cosine Translation) method in, e.g., Journal of the Visual Electronics Association Vol. 18, NO. 6, pp. 89 to 407. It is generally known that a high compression rate of $1/10$ to $1/20$ is obtained even when this PEG method is applied when compressing the image data.

The compressed raster data transmitted to the print system 2 from the host computers 1, 1', 1", .... are collected one after another by the print raster data recovery section 62 through the communications controller 57. The compressed raster data recovered by the print raster data recovery section 62 are restored by the print raster data restoration section 63. The thus-restored print raster data are expanded on the raster-expansion memory 65 together with the raster data expanded by the rasterize processing section 64 of the print system 2.

The print control section 56 monitors and controls the receipt of the print information, the pre-processing of the print information, the transmission of the divided print information, the recovery of the print raster data, the restoration of the print raster data, and the rasterize processing that are carried out in the print system 2.

As previously described, it is possible to reduce the time required to subject the print information to rasterize processing as well as to increase the processing speed of the overall print processing system in the print processing system of the second embodiment that consists of the plurality of arithmetic processing units loosely coupled through the communications network, as is the case in the first embodiment. In the case of the print processing system that consists of the plurality of arithmetic processing units loosely coupled through the communications network, the cost of the system is reduced because it is not necessary to introduce an expensive computer, compared with the print processing system that consists of a plurality of arithmetic processing units tightly coupled through a bus. Further, the arithmetic processing unit of the host computer connected to the communications network is used, and hence it becomes possible to increase the number of parallel-connected arithmetic processing units if the communications network is connected to a plurality of host computers. Moreover, even in the case of overlapping image elements, the completeness of the images is assured.

[Third Embodiment]

A third embodiment is directed to the application of the present invention to the system in which a dividing section for dividing a group of command sequences into a plurality of command sequence groups converts the command sequences into intermediate codes before load prediction for predicting the time required to carry out the rasterize processing of the command sequences.

Figure 14:
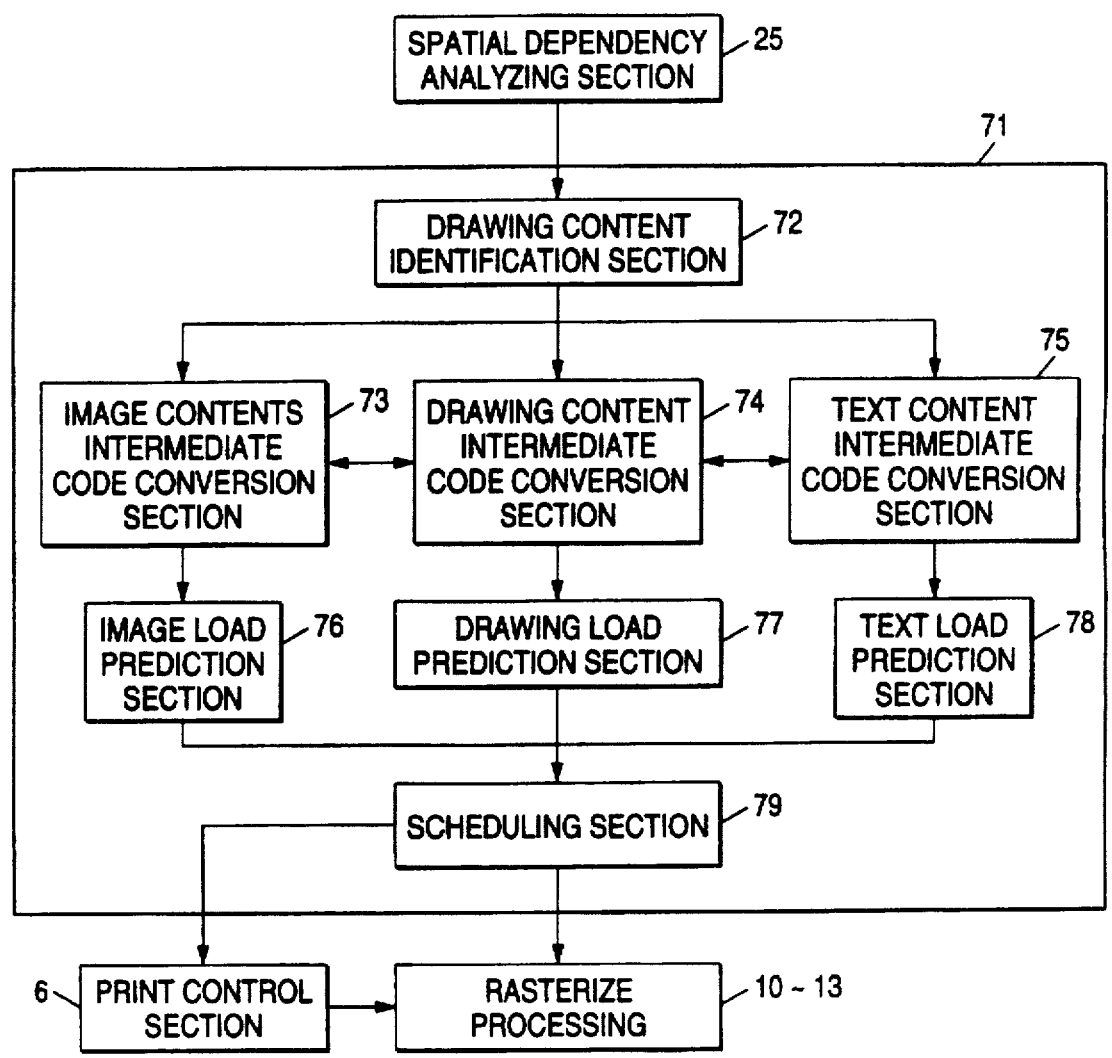
FIG. 14 is a block diagram of a dividing section of a third embodiment of the present invention.

FIG. 14 is a block diagram of a dividing section 71 of the third embodiment. In the drawing, the dividing section 71 has a drawing content identification section 72, intermediate code conversion sections 73, 74, and 75 corresponding to the respective drawing contents, load prediction sections 76, 77, and 78 corresponding to the respective intermediate codes, and a scheduling section 79.

The intermediate code conversion sections 73, 74, and 75 mainly convert graphics drawing contents into primitive codes with respect to the rasterize processing in the subsequent stage. Simultaneously, the replacement of the intermediate code conversion processing with simpler processing, the deletion of unnecessary codes, and the deletion of loop processed are carried out by these intermediate code conversion sections 73, 74, and 75.

Figure 15:
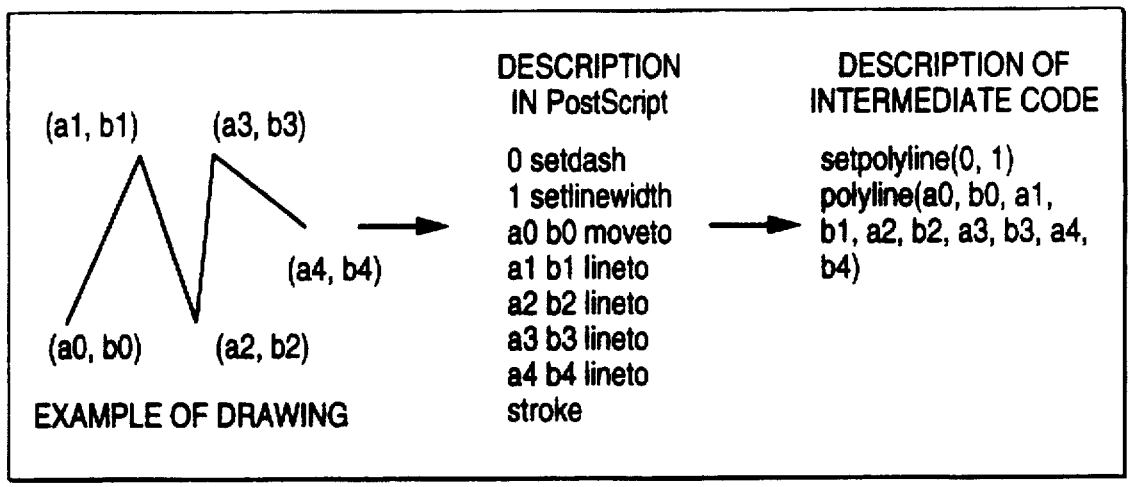
FIG. 15 is an example of the deletion of unnecessary codes.

FIG. 15 shows an example of the deletion of unnecessary codes. In the drawing, an example of a drawing consists of four solid lines having a line width "1". This drawing is described in seven lines of command sequences such as setdash, setlinewidth, or the like, in the case of PostScript. In contrast, the same drawing is described in two lines of intermediate codes, that is, setpolyline and polyline, in the case of the intermediate codes of the present embodiment. Other examples of the deletion of the unnecessary codes comprise the deletion of the area on which an image is overwritten and the deletion of the processing of the image to be cut by very simple drawing contents.

As a result of introduction of the intermediate codes of the present embodiment to the print processing system, several effects will be achieved: for example, improvements in the accuracy of prediction of loads on a graphics image due to conversion of the drawing contents into the primitive codes and a reduction in the rasterize processing time due to the deletion of unnecessary codes or loop processing.

As described above, by virtue of the print processing system and method of the present invention, the print information written in a page-description language is minutely divided when a plurality of arithmetic processing units execute print processing in a parallel manner, and the thus-divided print information is assigned to each of the arithmetic processing units on the basis of a resource attribute and spatial dependency. Consequently, it becomes possible to efficiently divided the print information and process the thus-divided print information. Further, it becomes possible to increase the processing speed of the overall print processing system as well as to reduce the time required to carry out the rasterize processing of the print information. By utilization of spatial dependency, the completeness of images is assured even if image elements overlap each other. It becomes also possible to use the arithmetic processing units of the respective host computers connected to the communications network as sections that carry out the rasterize processing of the print information. Therefore, it is possible to inexpensively provide a print processing system having high expandability.

What is claimed is:

1. A print processing system that carries out rasterize processing in order to obtain pixel information for printing purposes from a source file which includes print information written in a predetermined print control language, said print processing system comprising:

a plurality of arithmetic processing units that execute the rasterize processing;

token analyzing means for analyzing tokens of the source file and producing a print information command stream;

syntax analyzing means for analyzing syntax of the print information command stream and sequentially producing a command sequence to constitute a meaningful unit in terms of a syntax rule of the print language;

document syntax analyzing means for analyzing a stream of the command sequence and sequentially integrating one or a series of command sequences into environment contents including a command sequence for specifying a drawing environment or drawing contents including a command sequence for specifying a drawing operation;

resource attribute analyzing means for analyzing streams of the environment contents and the drawing contents, and for determining the rasterize processing resource required to execute the drawing contents;

dependency analyzing means for determining an order of processing of the plurality of drawing contents whose drawing results overlap each other on a print page;

print information dividing means for allocating the environment contents and the drawing contents to said plurality of arithmetic processing units on the basis of the rasterize processing resources determined by said resource attribute analyzing means and the processing order determined by said dependency analyzing means; and printing means for carrying out a printing operation according to the results of the processing of said plurality of arithmetic processing units.

2. A print processing system as defined in claim 1, wherein said print information dividing means comprises:

load prediction means for predicting a time required for each arithmetic processing unit to process the drawing contents; and scheduling means for determining schedules of the processing of the environment and drawing contents with respect to said plurality of arithmetic processing units on the basis of a prediction result of a load of the drawing contents, the rasterize processing resource determined by said resource attribute analyzing means, and the processing order determined by said dependency analyzing means.

3. A print processing system as defined in claim 1, wherein said information dividing means comprises:

intermediate code conversion means for converting each command sequence into an intermediate code;

load prediction means for predicting the time required to the rasterize processing of each command sequence which is converted into the intermediate code; and scheduling means for determining schedules of the processing of the environment and drawing contents with respect to said plurality of arithmetic processing units on the basis of a prediction result of a load of each command sequence, the rasterize processing resource determined by said resource attribute analyzing means, and the processing order determined by said dependency analyzing means.

4. A print processing system as defined in claim 1, wherein said plurality of arithmetic processing units are tightly coupled by means of shared memory.

5. A print processing system as defined in claim 2, wherein said plurality of arithmetic processing units are tightly coupled by means of shared memory.

6. A print processing system as defined in claim 3, wherein said plurality of arithmetic processing units are tightly coupled by means of shared memory.

7. A print processing system as defined in claim 1, wherein said plurality of arithmetic processing units are loosely coupled through a communications network.

8. A print processing system as defined in claim 2, wherein said plurality of arithmetic processing units are loosely coupled through a communications network.

9. A print processing system as defined in claim 3, wherein said plurality of arithmetic processing units are loosely coupled through a communications network.

10. A print processing system as defined in claim 1, wherein said resource attribute analyzing means comprises:
    means for determining a mutual hierarchical structure of the environment contents according to a rule previously determined with regard to a hierarchical relationship among the environments of drawings; and
    means for rendering the drawing contents, which have drawing environments the same as the drawing environments defined in a predetermined location of the hierarchical structure, to a predetermined location of the hierarchical structure of the environment contents determined by said hierarchical structure relationship determining means.

11. A print processing system as defined in claim 10, wherein said document syntax analyzing means comprises means for numbering the drawing contents in the order of the stream of the command sequences.

12. A print processing system as defined in claim 1, wherein said document syntax analyzing means has a content formation rule according to which one command sequence for specifying drawing environments is handled as one environment content, and according to which command sequences, comprising the same type of drawing operations and the drawing operations in the same environment, are grouped into one drawing content in the order of the stream of the command sequences.

13. A print processing system as defined in claim 12, wherein said document syntax analyzing means comprises:
    a register for storing a specific drawing environment of one drawing content when the drawing content is formed according to the content formation rule; and
    means for changing the contents stored in said register to a specific drawing environment of another drawing content in order for the drawing content when that drawing content is formed.

14. A print processing system as defined in claim 13, wherein said document syntax analyzing means integrates a series of command sequences and the specific drawing environment stored in the register for the command sequences into the drawing contents according to the content formation rule.

15. A print processing system as defined in claim in 1, wherein an image group is made by drawing contents which are exist on the same page, and wherein said print information dividing means comprises a scheduling section for dividing the drawing contents into the plurality of arithmetic processing units, said scheduling section having such a rule that overlapping drawing contents in the same image group are subjected to rasterize processing in ascending order from the bottom.

16. A print processing system as defined in claim in 1, wherein an image group is made by drawing contents which are exist on the same page, and wherein said print information dividing means comprises a scheduling section for dividing the drawing contents into the plurality of arithmetic processing units, said scheduling section having such a rule that overlapping drawing contents in the same image group are subjected to rasterize processing in descending order of predicted processing time as well as in ascending order from the bottom.

17. A pre-processing apparatus for use in a print processing system that carries out rasterize processing in order to obtain pixel information for printing purposes from a source file which includes print information written in a predetermined print control language, said print processing system comprising:
    token analyzing means for analyzing tokens of the source file and producing a print information command stream;
    syntax analyzing means for analyzing a syntax of the print information command stream and sequentially producing a command sequence to constitute a meaningful unit in terms of a syntax rule of the print language;
    document syntax analyzing means for analyzing a stream of the command sequence and sequentially integrating one or a series of command sequences into environment contents including a command sequence for specifying a drawing environment or drawing contents including a command sequence for specifying a drawing operation;
    resource attribute analyzing means for analyzing a streams of the environment contents and the drawing contents, and determining the rasterize processing resource required to execute the drawing contents;
    dependency analyzing means for determining an order of processing of the plurality of drawing contents whose drawing results overlap each other on a print page; and
    print information dividing means for allocating the environment contents and the drawing contents to said plurality of arithmetic processing units on the basis of the rasterize processing resources determined by said resource attribute analyzing means and the processing order determined by said dependency analyzing means.

18. A computer program embodied on a computer readable medium, said computer program running on a computer and enabling a plurality of arithmetic processing units to carry out rasterize processing in order to obtain pixel information for printing purposes from a source file which includes print information written in a predetermined print control language, said computer program comprising the steps of:
    analyzing tokens of the source file and producing a print information command stream;
    analyzing a syntax of the print information command stream and sequentially producing a command sequence to constitute a meaningful unit in terms of a syntax rule of the print language;
    analyzing a stream of the command sequence and sequentially integrating one or a series of command sequences into environment contents including a command sequence for specifying a drawing environment or drawing contents including a command sequence for specifying a drawing operation;

analyzing streams of the environment contents and the drawing contents and determining the rasterize processing resource required to execute the drawing contents;

determining an order of processing of the plurality of drawing contents whose drawing results overlap each other on a print page; and allocating the environment contents and the drawing contents to the plurality of arithmetic processing units on the basis of the rasterize processing resources which are determined to be required to execute the drawing contents and the processing order which is determined with respect to the plurality of overlapping drawing contents.

19. A print processing method that enables a plurality of arithmetic processing units to carry out rasterize processing in order to obtain pixel information for printing purposes from a source file which includes print information written in a predetermined print control language, said print processing method comprising the steps of:

analyzing tokens of the source file and producing a print information command stream;

analyzing a syntax of the print information command stream and sequentially producing a command sequence to constitute a meaningful unit in terms of a syntax rule of the print language;

analyzing a stream of the command sequence and sequentially integrating one or a series of command sequences into environment contents including a command sequence for specifying a drawing environment or drawing contents including a command sequence for specifying a drawing operation;

analyzing streams of the environment contents and the drawing contents and determining the rasterize processing resource required to execute the drawing contents;

determining an order of processing of the plurality of drawing contents whose drawing results overlap each other on a print page;

allocating the environment contents and the drawing contents to the plurality of arithmetic processing units on the basis of the rasterize processing resources which are determined to be required to execute the drawing contents and the processing order which is determined with respect to the plurality of overlapping drawing contents;

executing the allocated environment contents and drawing contents in said plurality of arithmetic processing units;

carrying out a printing operation corresponding to the result of the rasterize processing performed by the plurality of arithmetic processing units.

* * * * *